(12) United States Patent
Zhou et al.

(10) Patent No.: US 10,462,273 B2
(45) Date of Patent: Oct. 29, 2019

(54) FOLDABLE COVER ASSEMBLY, METHOD OF MANUFACTURE, AND DEVICE COMPRISING THE FOLDABLE COVER ASSEMBLY

(71) Applicant: SABIC Global Technologies, B.V., Bergen op Zoom (NL)

(72) Inventors: Hao Zhou, Mt. Vernon, IN (US); Seongnam Lee, Seoul-si (KR); Jong-Min Choi, Seongnam (KR); Jong Woo Lee, Seoul (KR)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/075,234

(22) PCT Filed: Feb. 2, 2017

(86) PCT No.: PCT/US2017/016143
§ 371 (c)(1),
(2) Date: Aug. 3, 2018

(87) PCT Pub. No.: WO2017/136507
PCT Pub. Date: Aug. 10, 2017

(65) Prior Publication Data
US 2019/0045038 A1 Feb. 7, 2019

Related U.S. Application Data

(60) Provisional application No. 62/291,808, filed on Feb. 5, 2016, provisional application No. 62/307,654, filed on Mar. 14, 2016.

(51) Int. Cl.
*H04M 1/02* (2006.01)
*B32B 7/12* (2006.01)
(Continued)

(52) U.S. Cl.
CPC .............. *H04M 1/0268* (2013.01); *B32B 7/12* (2013.01); *B32B 17/064* (2013.01); *B32B 27/32* (2013.01);
(Continued)

(58) Field of Classification Search
CPC ...... H04M 1/0268; B32B 7/12; B32B 17/064; B32B 27/32; B32B 27/36
(Continued)

(56) References Cited

U.S. PATENT DOCUMENTS 4,842,664 A * 6/1989 Baudin .................. B29C 53/04
156/102
2008/0318039 A1* 12/2008 Boven ............... B32B 17/10018
428/354
(Continued)

FOREIGN PATENT DOCUMENTS

| WO | 2013175448 A1 | 11/2013 | |
| WO | 2014072923 A1 | 5/2014 | |
| WO | WO-2016007743 A1 * | 1/2016 | ............... B32B 7/12 |

OTHER PUBLICATIONS

Hyuk-Jun Kwon et al., "Mechanically and optically reliable folding structure with a hyperelastic material for seamless foldable displays" Applied Physics Letters, vol. 98, 2011.
(Continued)

*Primary Examiner* — Tahseen Khan
(74) *Attorney, Agent, or Firm* — Cantor Colburn LLP

(57) ABSTRACT

A foldable cover assembly includes a glass layer having a first surface, a second surface opposite the first surface, a first thickness at a first location and a second thickness at a second location, wherein the second thickness is less than the first thickness. The second thickness is further effective to provide bendability to the glass layer. The foldable cover assembly further includes an optically clear polymer film
(Continued)

disposed on the first surface of the glass layer. The polymer film includes a thermoplastic polymer, a thermoset polymer, or a combination comprising at least one of the foregoing, wherein a 100 micrometer-thick sample of the optically clear polymer film transmits greater than 85% of visible light as determined according to ASTM D1003-00. A method for the manufacture of the foldable cover assembly is also described. The foldable cover assembly can be useful for use with an electronic device.

19 Claims, 1 Drawing Sheet

(51) Int. Cl.

| | | |
|---|---|---|
| *B32B 17/06* | (2006.01) | |
| *B32B 27/32* | (2006.01) | |
| *B32B 27/36* | (2006.01) | |

(52) U.S. Cl.
CPC ........ *B32B 27/36* (2013.01); *B32B 2307/412* (2013.01); *B32B 2457/20* (2013.01); *B32B 2457/208* (2013.01)

(58) Field of Classification Search
USPC .......................................................... 428/220
See application file for complete search history.

(56) References Cited

U.S. PATENT DOCUMENTS

| | | | |
|---|---|---|---|
| 2013/0295333 A1* | 11/2013 | Kim ........................ | G06F 3/041 |
| | | | 428/157 |
| 2014/0295363 A1 | 10/2014 | Sun et al. | |
| 2015/0004334 A1 | 1/2015 | Bae et al. | |
| 2015/0210588 A1* | 7/2015 | Chang .................... | C03C 21/002 |
| | | | 361/750 |
| 2018/0149904 A1* | 5/2018 | Song ....................... | G09F 9/301 |

OTHER PUBLICATIONS

International Search Report for International Application No. PCT/US2017/016143; International Filing Date: Feb. 2, 2017; dated May 11, 2017; 5 pages.
Written Opinion of the International Searching Authority for International Application No. PCT/US2017/016143; International Filing Date: Feb. 2, 2017; dated May 11, 2017; 10 pages.

* cited by examiner

FOLDABLE COVER ASSEMBLY, METHOD OF MANUFACTURE, AND DEVICE COMPRISING THE FOLDABLE COVER ASSEMBLY

CROSS-REFERENCE TO RELATED APPLICATIONS

This application is a National Stage application of PCT/US2017/016143, filed Feb. 2, 2017, which claims the benefit of U.S. Provisional Application No. 62/291,808, filed Feb. 5, 2016 and U.S. Provisional Application No. 62/307,654, filed Mar. 14, 2016, all of which are incorporated by reference herein in their entirety.

BACKGROUND

Electronic devices, including mobile electronic devices, personal electronic devices, handheld electronic devices, and the like typically include a display (e.g., a liquid crystal display). Display covers protect the display of various electronic devices, for example, from scratches, moisture, impact, and the like. Covers including glass and polymeric materials have been developed. Polymer-containing or "plastic" covers can suffer from poor scratch resistance. Glass covers have also been developed, because glass can be transparent and can be resilient to abrasion. However, while glass typically provides enhanced scratch resistance compared to plastic covers, glass can be brittle and susceptible to cracking and failure (e.g., when impacted along an edge). Glass covers also suffer from limitations relating to materials cost and ease of manufacture.

Foldable electronic devices in particular require a cover that is capable of folding with the device. A typical foldable display is flexible and foldable, can be easily carried, and has a large screen. A foldable display can be used in various devices such as portable phones, portable multimedia players (PMP), navigators, ultra-mobile personal computers (UMPC), electronic books, electronic newspapers, televisions, or monitors. The display industry generally prefers a 1 to 3 millimeter radius of folding curvature. It would be further advantageous if a foldable cover for use with a foldable display could withstand damage even after 200,000 folding cycles. As such, this requirement generally precludes glass materials. Flexible films having inorganic/organic hybrid coatings have also been explored. However, these can have insufficient hardness, and thus fail to meet all requirements of a foldable cover.

Accordingly, there remains a continuing need in the art for an improved foldable cover for foldable electronic devices that can overcome the above described technical limitations.

BRIEF DESCRIPTION

A foldable cover assembly comprises a glass layer having a first surface, a second surface opposite the first surface, a first thickness at a first location and a second thickness at a second location, wherein the second thickness is less than the first thickness, and is effective to provide bendability to the glass layer; and an optically clear polymer film disposed on the first surface of the glass layer, the polymer film comprising a thermoplastic polymer, a thermoset polymer, or a combination comprising at least one of the foregoing, wherein a 100 micrometer-thick sample of the optically clear polymer film transmits greater than 85% of visible light as determined according to ASTM D1003-00.

A method of manufacturing the foldable cover assembly comprises applying the polymer film to the first surface of the glass layer; contacting a masking layer with the second surface of the glass layer, wherein the masking layer comprises an aperture such that the first location of the glass layer is covered by the masking layer and the second location of the glass layer is exposed; etching at least a portion of the exposed second location of the glass layer to provide the glass layer having a first thickness at the first location and a second thickness at the second location, wherein the second thickness is less than the first thickness; and removing the masking layer from the cover assembly.

An electronic device comprising the foldable cover assembly is also described.

The above described and other features are exemplified by the following figures and detailed description.

BRIEF DESCRIPTION OF THE DRAWINGS

The following figures are exemplary embodiments wherein the like elements are numbered alike.

DETAILED DESCRIPTION

The present inventors have discovered a foldable cover assembly for an electronic device having a glass/plastic laminated structure which has been selectively etched or sintered to provide a thin section, imparting flexibility to the cover. In addition to exhibiting the desired flexibility and transparency for a foldable cover assembly, the foldable cover assembly described herein can further exhibit desirable surface hardness. Thus, the cover assembly can be particularly useful as a front cover for an electronic device (in particular, a foldable electronic device), for example where the cover assembly is in contact with a foldable display of the electronic device.

Figure 1:
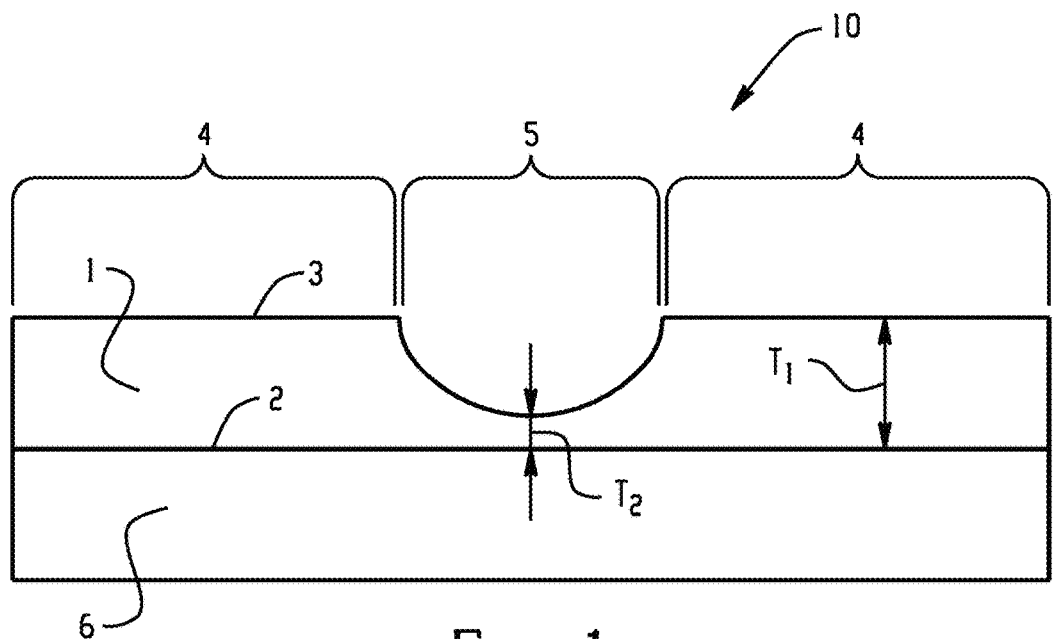
FIG. 1 shows a cross sectional view of a foldable cover assembly.

Accordingly, one aspect of the present disclosure is a foldable cover assembly comprising a glass layer and an optically clear polymer film. As used herein, the term "foldable" means that the shape of the cover assembly is not fixed but can be transformed from an initial shape into another shape. In other words, the term "foldable" means that the cover assembly can be folded or bent along one or more specific lines (a "fold-axis"). Additionally, the term "foldable" also means that cover assembly can be curved, bent or is rolled. The cover assembly can be as shown in FIG. 1. As shown in FIG. 1, the foldable cover assembly (10) comprises a glass layer (1) having a first surface (2) and a second surface (3) opposite the first surface. The glass layer (1) further has a first thickness ($T_1$) at a first location (4) and a second thickness ($T_2$) at a second location (5). The foldable cover assembly further comprises an optically clear polymer film (6) disposed on the first surface (2) of the glass layer (1).

The glass layer has a first surface and a second surface opposite the first surface. The glass layer can be, but is not limited to, chemically strengthened glass (e.g., CORNING™ GORILLA™ Glass commercially available from Corning Inc., XENSATION™ glass commercially available from Schott AG, DRAGONTRAIL™ glass commercially available from Asahi Glass Company, LTD, and CX-01 glass commercially available from Nippon Electric Glass Company, LTD, and the like), non-strengthened glass such as non-hardened glass including low sodium glass (e.g., CORNING™ WILLOW™ Glass commercially available from Corning Inc. and OA-10G Glass-on-Roll glass commercially available from Nippon Electric Glass Company, LTD, and the like), tempered glass, or optically transparent synthetic crystal (also referred to as sapphire glass, commercially available from GT Advanced Technologies Inc.).

The glass layer further has a first thickness at a first location and a second thickness at a second location. The second thickness is less than the first thickness. The second thickness is effective to provide bendability or flexibility to the glass layer. The first location can be adjacent to the second location. In some embodiments, the second location is preferably between a first and second portion of the first location. In some embodiments, the first thickness of the glass layer is 50 micrometers to 1 millimeter, preferably 50 micrometers to 0.7 millimeter, more preferably 50 to 400 micrometers. In some embodiments, the second thickness of the glass layer is 10 to 750 micrometers, preferably 10 micrometers to 500 micrometers, more preferably 10 to 300 micrometers. Without wishing to be bound by theory, it is believed that the thickness of the second location (i.e., the second thickness) facilitates the desirable foldability of the cover assembly described herein.

In some embodiments, the second location of the glass layer can have a variable thickness, provided that the thickness at any given point in the second location is less than the first thickness. In some embodiments, the second surface of the glass layer at the second location can have a concave shape (for example, as shown in FIG. 1). In some embodiments, the first surface of the glass layer is substantially flat, and the concave shape of the second location is formed from the second surface. In some embodiments, the second thickness at a center point of the second location is less than the second thickness at a periphery of the second location (i.e., at or near a border of the first and second locations).

In some embodiments, one or both surfaces of the glass layer can be a textured surface, which can provide, for example, anti-glare properties, anti-reflective properties, anti-microbial properties, and the like, or a combination comprising at least one of the foregoing.

In addition to the glass layer, the cover assembly further includes an optically clear polymer film. The optically clear polymer film is disposed on the first surface of the glass layer. As used herein, the term "optically clear polymer film" means that a 100 micrometer-thick sample of the optically clear polymer film transmits greater than 85% of visible light as determined according to ASTM D1003-00. In some embodiments, the optically clear polymer film can have a thickness of 1 micrometer to 20 millimeters, preferably 5 micrometers to 20 millimeters, more preferably 5 micrometers to 10 millimeters, even more preferably 5 micrometers to 1 millimeter, even more preferably still 5 to 250 micrometers, most preferably 5 to 100 micrometers.

The optically clear polymer film comprises a thermoplastic polymer, a thermoset polymer, or a combination comprising at least one of the foregoing. In some embodiments, the polymer film comprises a thermoplastic polymer. As used herein, the term "thermoplastic" refers to a material that is plastic or deformable, melts to a liquid when heated, and freezes to a brittle, glassy state when cooled sufficiently. Examples of thermoplastic polymers that can be used include polyacetals (e.g., polyoxyethylene and polyoxymethylene), poly($C_{1-6}$ alkyl)acrylates, polyacrylamides (including unsubstituted and mono-N— and di-N—($C_{1-8}$ alkyl) acrylamides), polyamides (e.g., aliphatic polyamides, polyphthalamides, and polyaramides), polyamideimides, polyanhydrides, polyarylene ethers (e.g., polyphenylene ethers), poly(arylene ketones) (e.g., polyetheretherketones (PEEK), polyetherketoneketones (PEKK), polyetherketones (PEK), and the like), polyarylene sulfides (e.g., polyphenylene sulfides (PPS)), polyarylene sulfones (e.g., polyethersulfones (PES), polyphenylene sulfones (PPS), and the like), polybenzothiazoles, polybenzoxazoles, polybenzimidazoles, polycarbonates (including homopolycarbonates and polycarbonate copolymers such as polycarbonate-siloxanes, polycarbonate-esters, and polycarbonate-ester-siloxanes), polyesters (e.g., polyethylene terephthalates (PET), polybutylene terephthalates (PBT), polyarylates, and polyester copolymers such as polyester-ethers), polyetherimides (including copolymers such as polyetherimide-siloxane copolymers), polyimides (including copolymers such as polyimide-siloxane copolymers), poly($C_{1-6}$ alkyl)methacrylates, polymethacrylamides (including unsubstituted and mono-N— and di-N—($C_{1-8}$ alkyl)acrylamides), cyclic olefin polymers (including polynorbornenes and copolymers containing norbornenyl units, for example copolymers of a cyclic polymer such as norbornene and an acyclic olefin such as ethylene or propylene), polyolefins (e.g., polyethylenes, polypropylenes, and their halogenated derivatives (such as polytetrafluoroethylenes), and their copolymers, for example ethylene-alpha-olefin copolymers, polyoxadiazoles, polyoxymethylenes, polyphthalides, polysilazanes, silicones (e.g., polydiorganosiloxanes), polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl nitriles, polyvinyl ketones, polyvinyl thioethers, polyvinylidene fluorides, or the like, or a combination comprising at least one of the foregoing thermoplastic polymers.

In some embodiments, the polymer film comprises a polyacetal, a poly($C_{1-6}$ alkyl)acrylate, a polycarbonate, a polyester, a polyetherimide, a polyimide, a poly($C_{1-6}$ alkyl) methacrylate, a polyolefin (including a cyclic olefin copolymer), a polystyrene, a polyurethane, a polyvinyl alcohol, a polyvinyl ester, a polyvinyl ether, a polyvinyl halide, a polyvinyl nitrile, a polyvinyl ketone, a polyvinylidene fluoride, or a combination comprising at least one of the foregoing thermoplastic polymers. In some embodiments, the polymer film comprises a polyimide, a polyetherimide, a polyester, a polyolefin, a polycarbonate, a poly($C_{1-6}$ alkyl) acrylate, a poly($C_{1-6}$ alkyl)methacrylate, or a combination comprising at least one of the foregoing. In some embodiments, the optically clear polymer film comprises poly (methyl methacrylate), a polycarbonate, or a combination comprising at least one of the foregoing.

In some embodiments, the optically clear polymer film can include a polycarbonate. "Polycarbonate" as used herein means a homopolymer or copolymer having repeating structural carbonate units of formula (1)

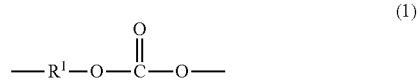
(1)

wherein at least 60 percent of the total number of $R^1$ groups are aromatic, or each $R^1$ contains at least one $C_{6-30}$ aromatic group. Polycarbonates and their methods of manufacture are known in the art, being described, for example, in WO 2013/175448 A1, US 2014/0295363, and WO 2014/072923.

Polycarbonates are generally manufactured from bisphenol compounds such as 2,2-bis(4-hydroxyphenyl) propane ("bisphenol-A" or "BPA"), 3,3-bis(4-hydroxyphenyl) phthalimidine, (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl) cyclohexane ("DMB"), or 1,1-bis(4-hydroxy-3-methylphenyl)-3,3,5-trimethylcyclohexane ("isophorone bisphenol"), or a combination comprising at least one of the foregoing bisphenol compounds can also be used. In a specific embodiment, the polycarbonate is a homopolymer derived from BPA; a copolymer derived from BPA and another bisphenol or dihydroxy aromatic compound such as resorcinol; or a copolymer derived from BPA and optionally another bisphenol or dihydroxyaromatic compound, and further comprising non-carbonate units, for example aromatic ester units such as resorcinol terephthalate or isophthalate, aromatic-aliphatic ester units based on $C_{6-20}$ aliphatic diacids, polysiloxane units such as polydimethylsiloxane units, or a combination comprising at least one of the foregoing.

In a specific embodiment, the polycarbonate is a linear homopolymer containing bisphenol A carbonate units (BPA-PC), commercially available under the trade name LEXAN from SABIC; or a branched, cyanophenol end-capped bisphenol A homopolycarbonate produced via interfacial polymerization, containing 3 mol % 1,1,1-tris(4-hydroxyphenyl)ethane (THPE) branching agent, commercially available under the trade name LEXAN CFR from SABIC. A combination of a linear polycarbonate and a branched polycarbonate can be used. It is also possible to use a polycarbonate copolymer or interpolymer rather than a homopolymer. Polycarbonate copolymers can include copolycarbonates comprising two or more different types of carbonate units, for example units derived from BPA and PPPBP (commercially available under the trade name XHT from SABIC); BPA and DMBPC (commercially available under the trade name DMX from SABIC); or BPA and isophorone bisphenol (commercially available under the trade name APEC from Bayer). The polycarbonate copolymers can further comprise non-carbonate repeating units, for example repeating ester units (polyester-carbonates), such as those comprising resorcinol isophthalate and terephthalate units and bisphenol A carbonate units, such as those commercially available under the trade name LEXAN SLX from SABIC; bisphenol A carbonate units and isophthalate-terephthalate-bisphenol A ester units, also commonly referred to as poly(carbonate-ester)s (PCE) or poly(phthalate-carbonate)s (PPC), depending on the relative ratio of carbonate units and ester units; or bisphenol A carbonate units and $C_{6-12}$ dicarboxy ester units such as sebacic ester units (commercially available under the trade name HFD from SABIC) Other polycarbonate copolymers can comprise repeating siloxane units (polycarbonate-siloxanes), for example those comprising bisphenol A carbonate units and siloxane units (e.g., blocks containing 5 to 200 dimethylsiloxane units), such as those commercially available under the trade name EXL from SABIC; or both ester units and siloxane units (polycarbonate-ester-siloxanes), for example those comprising bisphenol A carbonate units, isophthalate-terephthalate-bisphenol A ester units, and siloxane units (e.g., blocks containing 5 to 200 dimethylsiloxane units), such as those commercially available under the trade name FST from SABIC. Combinations of any of the above materials can be used.

Combinations of polycarbonates with other polymers can be used, for example a combination (preferably an alloy) of bisphenol A polycarbonate with an ester such as poly (butylene terephthalate) or poly(ethylene terephthalate), each of which can be semicrystalline or amorphous. Such combinations are commercially available under the trade name XENOY and XYLEX from SABIC.

A specific copolycarbonate includes bisphenol A and bulky bisphenol carbonate units, i.e., derived from bisphenols containing at least 12 carbon atoms, for example 12 to 60 carbon atoms or 20 to 40 carbon atoms. These polycarbonates have high melting points, good chemical resistance, and good scratch resistance. Examples of such copolycarbonates include BPA-PPPBP copolymers such as LEXAN XHT from SABIC), BPA-DMBPC copolymers such as LEXAN DMC from SABIC, or a copolymer comprising bisphenol A carbonate units and isophorone bisphenol carbonate units (commercially available under the trade name APEC from Bayer) as described above.

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

In some embodiments, the optically clear polymer film can include a polyester as described above. Specific polyesters can include PET, PBT, a glycol-modified poly(ethylene terephthalate), poly(ethylene naphthalate) (PEN), poly(1,4-cyclohexane-dimethanol-1,4-cyclohexane dicarboxylate) (PCCD), poly(cyclohexanedimethylene terephthalate)-co-poly(ethylene terephthalate), or a combination comprising at least one of the foregoing polyesters.

In some embodiments, the optically clear polymer film can include a cyclic olefin polymer, a polyolefin, or a combination comprising at least one of the foregoing. Representative examples of cyclic olefin polymers include polynorbornene and copolymers of norbornene and ethylene or propylene. Representative examples of polyolefins are polyethylene, polypropylene, polybutylene, polymethylpentene (and co-polymers thereof), polynorbornene (and co-polymers thereof), poly(1-butene), poly(3-methylbutene), poly(4-methylpentene) and copolymers of ethylene with alpha-olefins such as propylene, 1-butene, 1-hexene, 1-octene, 1-decene, 4-methyl-1-pentene and 1-octadecene. Representative combinations of polyolefins are combinations containing polyethylene and polypropylene, low-density polyethylene and high-density polyethylene, and polyethylene and olefin copolymers containing copolymerizable monomers, e.g., ethylene and acrylic acid copolymers; ethyl and methyl acrylate copolymers; ethylene and ethyl acrylate copolymers; ethylene and vinyl acetate copolymers, ethylene, acrylic acid, and ethyl acrylate copolymers, and ethylene, acrylic acid, and vinyl acetate copolymers. In some embodiments, the thermoplastic polymer can include a polyolefin elastomer.

Thermoset polymers are derived from thermosetting prepolymers (resins) that can irreversibly harden and become insoluble with polymerization or cure, which can be induced by heat or exposure to radiation (e.g., ultraviolet light, visible light, infrared light, or electron beam (e-beam) radiation). Thermoset polymers include alkyds, bismaleimide polymers, bismaleimide triazine polymers, cyanate ester polymers, benzocyclobutene polymers, diallyl phthalate polymers, epoxies, hydroxymethylfuran polymers, melamine-formaldehyde polymers, phenolics (including phenol-formaldehyde polymers such as novolacs and resoles), benzoxazines, polydienes such as polybutadienes (including homopolymers and copolymers thereof, e.g. poly(butadiene-isoprene)), polyisocyanates, polyureas, polyurethanes, silicones, triallyl cyanurate polymers, triallyl isocyanurate polymers, polyimides, certain silicones, and copolymerizable prepolymers (e.g., prepolymers having ethylenic unsaturation, such as unsaturated polyesters polyimides), or the like. The prepolymers can be copolymerized or crosslinked with a reactive monomer such as styrene, alpha-methylstyrene, vinyltoluene, chlorostyrene, acrylic acid, (meth)acrylic acid, a ($C_{1-6}$ alkyl)acrylate, a ($C_{1-6}$ alkyl) methacrylates, acrylonitrile, vinyl acetate, allyl acetate, triallyl cyanurate, triallyl isocyanurate, or acrylamide. The molecular weight of the prepolymers can be 400 to 10,000 Daltons on average. A combination of different thermosets can be used. Combinations comprising a thermoplastic polymer and a thermoset polymer can also be used.

In some embodiments, one or both surfaces of the polymer film can be a textured surface, which can provide, for example, anti-glare properties, anti-reflective properties, anti-microbial properties, and the like, or a combination comprising at least one of the foregoing.

In some embodiments, the foldable cover assembly can optionally further include an optically clear adhesive layer disposed between the first surface of the glass layer and the polymer film, wherein a 50 micrometer-thick sample of the optically clear adhesive transmits greater than 85% of visible light as determined according to ASTM D1003-00. In some embodiments, the optically clear adhesive layer is in adhesive contact with the entire first surface of the glass layer. When present, the optically clear adhesive layer can have a thickness of 1 to 2000 micrometers, or 1 to 1000 micrometers, or 1 to 500 micrometers, or 1 to 100 micrometers, or 10 to 100 micrometers, or 10 to 50 micrometers, or 12.5 to 25 micrometers.

When present, the adhesive can include epoxy, acrylate, amine, urethane, silicone, thermoplastic urethane, ethyl vinyl acetate, hindered amine light stabilizer free ethyl vinyl acetate (HALS free EVA), or a combination comprising at least one of the foregoing. In an embodiment, the adhesive is a hindered amine light stabilizer free ethyl vinyl acetate (HALS free EVA). In an embodiment the adhesive is a thermoplastic urethane, or an ultra violet light cured modified acrylate optical quality adhesive, or a silicone pressure sensitive adhesive, or an acrylate pressure sensitive adhesive. The adhesive can be applied using a process such as roll lamination, roller coating, screen printing, spreading, spray coating, spin coating, dip coating, and the like, or a combination comprising at least one of the foregoing techniques.

In some embodiments, the foldable cover assembly can optionally further comprise a second optically clear adhesive layer, preferably disposed on at least a portion of the polymer film on a side opposite the glass layer. The second optically clear adhesive layer can be the same or different from the optically clear adhesive layer described above. In some embodiments, the second optically clear adhesive layer functions to adhere the cover assembly to an electronic device (e.g., a display of the electronic device).

In some embodiments, the cover assembly can further include one or more functional layers. A functional layer can be disposed on at least a portion of the glass layer, the polymer film, or both. In some embodiments, a functional layer is preferably disposed on both sides of the glass layer, both sides of the polymer layer, or both. The optional functional layer can include an ultraviolet light protection layer, a touch sensing layer, abrasion resistant layer, infrared absorbing layer, infrared reflecting layer, hydrophobic layer, hydrophilic layer, anti-fingerprint layer, anti-smudge layer, anti-glare layer, anti-reflection layer, antimicrobial layer, conductive layer, electromagnetic radiation shielding layer (e.g., an electromagnetic interference shielding layer), anti-frost layer, anti-fog layer, image forming layer (e.g., an ink layer), or a combination including at least one of the foregoing. In some embodiments, the functional layer can preferably include an anti-reflection layer, an anti-glare layer, an antimicrobial layer, a conductive layer, an anti-fingerprint layer, an anti-smudge layer, an anti-fog layer, or a combination comprising at least one of the foregoing. In some embodiments, the functional layer can further be textured. The functional layer can be disposed in any form, e.g., a film, coating, coextruded layer, deposited layer, molded layer, or the like.

Figure 2:
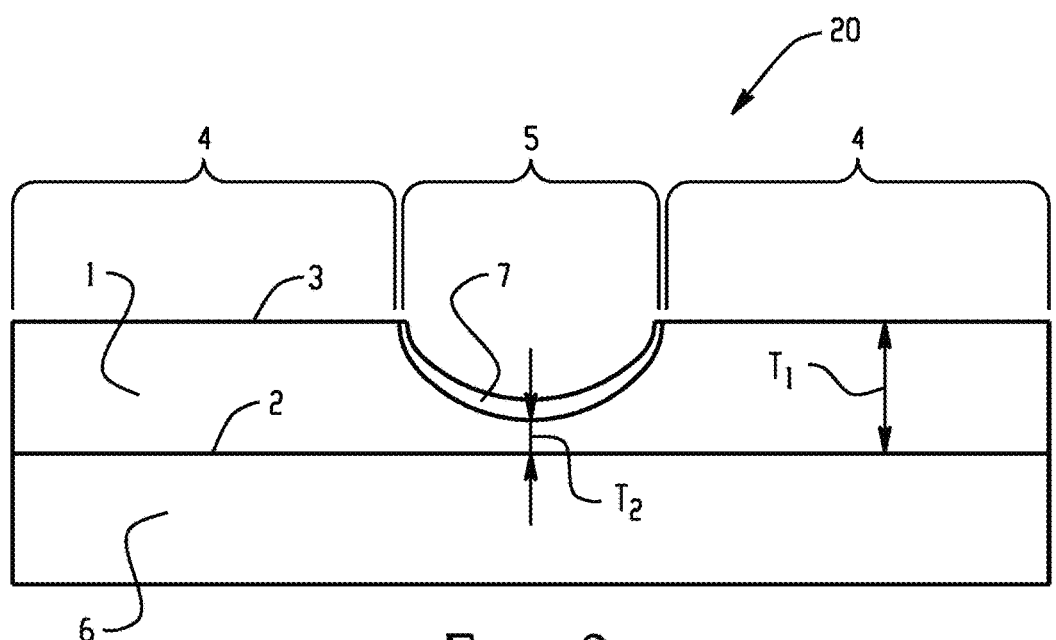
FIG. 2 shows a cross sectional view of a foldable cover assembly.

In some embodiments, the foldable cover assembly can optionally further comprise an optically clear coating, as shown in FIG. 2. When present, the optically clear coating can be disposed on at least a portion of the second surface of the second location of the glass layer, wherein the coating provides a difference in refractive index of the second location and refractive of the first location that is less than or equal to 0.05. A 50 micrometer-thick sample of the optically clear coating transmits greater than 85% of visible light as determined according to ASTM D1003-00. When present, the optically clear coating can have a thickness of 1 to 1000 micrometers, or 1 to 500 micrometers, or 1 to 100 micrometers, or 10 to 100 micrometers, or 10 to 50 micrometers, or 12.5 to 25 micrometers. When present, the optically clear coating can comprise an optically clear thermoplastic polymer film, wherein the optically clear thermoplastic polymer can be as described above.

The foldable cover assembly can have one or more of the following properties.

The foldable cover assembly can preferably be a transparent foldable cover assembly, wherein the cover assembly transmits greater than 85% of visible light as determined according to ASTM D1003-00.

In some embodiments, the foldable cover assembly can have a surface hardness of at least 7H. Without wishing to be bound by theory, it is believed that the cover assembly will not crack easily when impacted at such a hardness. Surface hardness can be determined by measuring pencil hardness according to ASTM D3363. Pencil hardness is a measure of the hardness of a material on a scale ranging from 9H (hardest) to 9B (softest). In general, the pencil hardness scale is 9H (hardest), 8H, 7H, 6H, 5H, 4H, 3H, 2H, H, F, HB (medium), B, 2B, 3B, 4B, 5B, 6B, 7B, 8B, and 9B (softest), for example, at 700 g. Thus, in some embodiments, the foldable cover assembly can have a hardness that is 7H, 8H, or 9H.

As mentioned above, the glass layer has a first thickness and a second thickness, wherein the second thickness is effective to provide bendability to the glass layer. Accordingly, in some embodiments, the foldable cover assembly is bendable, preferably the cover assembly has a flexibility of 3R or less as measured according to JIS K6902. In some embodiments, the cover assembly can advantageously exhibit a flexibility of 3R or less while maintaining the surface hardness.

The foldable cover assembly can be manufactured by applying the polymer film to the first surface of the glass layer. The polymer film can be prepared using any method for preparing a polymer film that is generally known. For example, the polymer film can be prepared by extrusion, solution casting, melt blowing, 3D printing, mono- or biaxial stretching, and the like. In some embodiments, the polymer film is prepared by extrusion, solution casting, or melt blowing. Optionally, the polymer film can be applied to the glass layer via an adhesive layer, as discussed above. When present, the adhesive layer can first be applied to the at least a portion of the first surface of the glass layer, and the polymer film can subsequently be applied thereto. The adhesive can be applied using any suitable process including, but not limited to, roll lamination, roller coating, screen printing, spreading, spray coating, spin coating, dip coating, and the like, or a combination comprising at least one of the foregoing techniques.

The method of manufacturing the foldable cover assembly further comprises contacting a masking layer with the second surface of the glass layer (i.e., on a side opposite the polymer film). The masking layer comprises an aperture such that a portion of the second surface of the glass layer remains exposed, and the remaining portion of the second surface of the glass layer is covered. Preferably, the masking layer includes an aperture such that the first location of the glass layer is covered by the masking layer and the second location of the glass layer is exposed.

The masking layer can include materials such as films or inks that can be coated on the second surface of the glass layer, for example, by lamination or screen printing processes. Exemplary masking materials can include, but are not limited to an inorganic oxide (e.g., silicon dioxide), an inorganic nitride (e.g., silicon nitride), a cured resin, a wax coating, and the like, or a combination comprising at least one of the foregoing. After contacting the masking layer with the second surface of the glass layer, the at least a portion of the exposed second location of the glass layer is etched to provide a glass layer having a first thickness at the first location and a second thickness at the second location, wherein the second thickness is less than the first thickness. As discussed above, the second thickness is effective to provide bendability (i.e., flexibility) to the glass layer. The etching can be using any suitable etching process including, chemical etching (e.g., using aqueous solutions comprising one or more water-soluble inorganic fluoride compounds having utility for the dissolution of silicate glasses including, for example, HF, sodium fluoride, potassium fluoride, ammonium fluoride, sodium bifluoride, potassium bifluoride, ammonium bifluoride, and or a combination comprising at least one of the foregoing), laser etching, or a combination comprising at least one of the foregoing etching processes. One of ordinary skill in the art would readily understand what type of masking layer would be suitable for a particular etching process selected for the selective etching of the second surface of the glass layer. The masked, glass layer can be subjected to the desired etching process for an appropriate time to achieve the desired second thickness of the glass layer. After the selective etching has been completed (including washing off the etching solution with deionized water, for example), the masking layer can be removed. For example, the masking layer can be peeled or otherwise stripped using a suitable stripper solution depending on the particular masking layer composition employed in the selective etching process.

In some embodiments, when an optically clear coating is present on at least a portion of the second surface of the second location of the glass layer, as described above and as shown in FIG. 2, the method can further comprise applying the optically clear coating to the desired portion of the second surface of the second location of the glass layer, preferably applying the coating to the etched portion of the second surface of the glass layer. The applying can be by, for example, roll lamination, roller coating, screen printing, spreading, spray coating, spin coating, dip coating, and the like, or a combination comprising at least one of the foregoing techniques. In some embodiments, a film of the optically clear coating can be prepared and subsequently laminated to the desired portion of the cover assembly.

The foldable cover assemblies of the present disclosure can be useful for a wide variety of applications including consumer electronics. Accordingly, an electronic device comprising the cover assembly represents another aspect of the present disclosure. In some embodiments, the foldable cover assembly can be disposed on a display of an electronic device (e.g., as a screen protector for the display of the device), preferably a foldable electronic device. The displays are preferably foldable displays. In some embodiments, the display can be a touch screen display. Examples of electronic devices that can be utilized with the cover assembly include but are not limited to, a cellular telephone, a smart telephone, a laptop computer, a notebook computer, a tablet computer, an automotive display (e.g., an automotive interior center console display), a medical device, a smart window, public information displays, a wearable electronic device (e.g., smart watch, activity tracker, health tracker, health monitoring devices, and the like). In some embodiments, the foldable cover assembly can be useful as an accessory for an electronic device. For example, a cover or case for an electronic device (e.g., a mobile electronic device) can include the foldable cover assembly. In some embodiments, a cover or case comprising the foldable cover assembly can be a foldable cover or case for use with a foldable electronic device. In some embodiments, the foldable cover assembly can further serve as a barrier layer for oxygen and moisture, such that no additional barrier layer is required (i.e., to protect the electronic device from oxygen and moisture).

In some embodiments, the foldable cover assembly is laminated onto the electronic or lighting device, molded onto the electronic or lighting device, or adhered onto the electronic or lighting device via an adhesive layer. When an adhesive layer is used, a 50 micrometer thick sample of the adhesive layer transmits greater than 85% of visible light as determined according to ASTM D1003-00.

The foldable cover assembly described herein provides a lightweight cover assembly for a foldable electronic device, where bendability of the cover assembly is required. Advantageously, the foldable cover assembly exhibits transmission of greater than 85% of visible light, as determined according to ASTM D1003-00, as well as the desired combination of surface hardness and flexibility. Thus, a significant improvement in foldable cover assemblies for electronic devices is provided by the present disclosure.

This disclosure further encompasses the following non-limiting embodiments.

Embodiment 1

A foldable cover assembly (10), comprising a glass layer (1) having a first surface (2), a second surface (3) opposite the first surface (2), a first thickness ($T_1$) at a first location (4) and a second thickness ($T_2$) at a second location (5), wherein the second thickness is less than the first thickness, and is effective to provide bendability to the glass layer; and an optically clear polymer film (6) disposed on the first surface of the glass layer, the polymer film comprising a thermoplastic polymer, a thermoset polymer, or a combination comprising at least one of the foregoing, wherein a 100 micrometer-thick sample of the optically clear polymer film transmits greater than 85% of visible light as determined according to ASTM D1003-00.

Embodiment 2

The foldable cover assembly of embodiment 1, wherein the cover assembly transmits greater than 85% of visible light as determined according to ASTM D1003-00.

Embodiment 3

The foldable cover assembly of embodiment 1 or 2, wherein the cover assembly has a surface hardness of at least 7H as measured according to ASTM 3363, a flexibility at the second location of 3R or less as measured according to JIS K6902, or both.

Embodiment 4

The foldable cover assembly of any one or more of embodiments 1 to 3, wherein the first thickness of the glass layer is 50 micrometers to 1 millimeter, preferably 50 micrometers to 0.7 millimeter, more preferably 50 to 400 micrometers.

Embodiment 5

The foldable cover assembly of any one or more of embodiments 1 to 4, wherein the second thickness of the glass layer is 10 to 750 micrometers, preferably 10 micrometers to 500 micrometers, more preferably 10 to 300 micrometers.

Embodiment 6

The foldable cover assembly of any one or more of embodiments 1 to 5, wherein the glass layer comprises chemically strengthened glass, non-strengthened glass, tempered glass, or optically transparent synthetic crystal.

Embodiment 7

The foldable cover assembly of any one or more of embodiments 1 to 6, wherein the first location is adjacent to the second location, preferably wherein the second location is between a first and second portion of the first location.

Embodiment 8

The foldable cover assembly of any one or more of embodiments 1 to 7, wherein the second thickness at a center point of the second location is less than the second thickness at a periphery of the second location.

Embodiment 9

The foldable cover assembly of any one or more of embodiments 1 to 8, wherein the polymer film comprises a polyacetal, poly($C_{1-6}$ alkyl)acrylate, polycarbonate, polyester, polyetherimide, polyimide, poly($C_{1-6}$ alkyl)methacrylate, polyolefin, polystyrene, polyurethane, polyvinyl alcohol, polyvinyl ester, polyvinyl ether, polyvinyl halide, polyvinyl nitrile, polyvinyl ketone, polyvinylidene fluoride, a cyclic olefin copolymer, or a combination comprising at least one of the foregoing thermoplastic polymers, preferably wherein the polymer film comprises poly(ethylene terephthalate), poly(ethylene naphthalate), poly(1,4-cyclohexane-dimethanol-1,4-cyclohexane dicarboxylate), poly(cyclohexanedimethylene terephthalate)-co-poly(ethylene terephthalate), polyethylene, polypropylene, a bisphenol A polycarbonate homopolymer, a bisphenol A polycarbonate copolymer, poly(4,4'-oxydiphenylene-pyromellitimide), polyvinylidene fluoride, polyvinyl fluoride, poly(methyl methacrylate), polystyrene, polyoxymethylene, poly(ethylene-vinyl acetate), polymethylpentane, or a combination comprising at least one of the foregoing.

Embodiment 10

The foldable cover assembly of any one or more of embodiments 1 to 9, wherein the polymer film has a thickness of 1 micrometer to 20 millimeters, preferably 5 micrometers to 20 millimeters, more preferably 5 micrometers to 10 millimeters, even more preferably 5 micrometers to 1 millimeter, even more preferably still 5 to 250 micrometers, most preferably 5 to 100 micrometers.

Embodiment 11

The foldable cover assembly of any one or more of embodiments 1 to 10, wherein the cover assembly further comprises an optically clear adhesive layer disposed between the first surface of the glass layer and the polymer film, wherein a 50 micrometer-thick sample of the optically clear adhesive transmits greater than 85% of visible light as determined according to ASTM D1003-00.

Embodiment 12

The foldable cover assembly of any one or more of embodiments 1 to 11, further comprising an optically clear coating (7) disposed on at least a portion of the second surface (3) of the second location (5) of the glass layer, wherein the coating provides a difference in refractive index of the second location and refractive of the first location that is less than or equal to 0.05.

Embodiment 13

A method of manufacturing the foldable cover assembly of any one or more of embodiments 1 to 12, the method comprising: applying the polymer film to the first surface of the glass layer; contacting a masking layer with the second surface of the glass layer, wherein the masking layer comprises an aperture such that the first location of the glass layer is covered by the masking layer and the second location of the glass layer is exposed; etching at least a portion of the exposed second location of the glass layer to provide the glass layer having a first thickness at the first location and a second thickness at the second location, wherein the second thickness is less than the first thickness; and removing the masking layer from the cover assembly.

Embodiment 14

The method of embodiment 13, further comprising applying an optically clear coating (7) on at least a portion of the second surface of the second location of the glass layer, wherein the coating provides a difference in refractive index of the second location and refractive of the first location that is less than or equal to 0.05.

Embodiment 15

An electronic device comprising the foldable cover assembly of any one or more of embodiments 1 to 12.

Embodiment 16

The electronic device of embodiment 15, comprising the foldable cover assembly disposed on a display of the electronic device.

Embodiment 17

The electronic device of embodiment 15 or 16, wherein the device is a foldable device.

Embodiment 18

The electronic device of any one or more of embodiments 15 to 17, wherein the device is a cellular telephone, a smart telephone, a laptop computer, a notebook computer, a tablet computer, a smart watch, an automobile display device, or a medical device.

Embodiment 19

The electronic device of any one or more of embodiments 15 to 18, wherein the display is a touch screen display.

Embodiment 20

The electronic device of any one or more of embodiments 15 to 19, wherein the cover assembly is laminated onto the device, or molded onto the device, or adhered onto the device via an adhesive layer, wherein a 50 micrometer-thick sample of the adhesive layer transmits greater than 85% of visible light as determined according to ASTM D1003-00.

Embodiment 21

An accessory for an electronic device comprising the foldable cover assembly of any one or more of embodiments 1 to 12, preferably wherein the accessory is a cover or case for a mobile electronic device.

The assemblies, methods, and devices can alternatively comprise, consist of, or consist essentially of, any appropriate components or steps herein disclosed. The assemblies, methods, and devices can additionally, or alternatively, be formulated so as to be devoid, or substantially free, of any steps, components, materials, ingredients, adjuvants, or species that are otherwise not necessary to the achievement of the function or objectives of the assemblies, methods, and devices.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments," "an embodiment," and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a C$_{1-9}$ alkoxy, a C$_{1-9}$ haloalkoxy, a nitro (—NO$_2$), a cyano (—CN), a C$_{1-6}$ alkyl sulfonyl (—S(=O)$_2$-alkyl), a C$_{6-12}$ aryl sulfonyl (—S(=O)$_2$-aryl) a thiol (—SH), a thiocyano (—SCN), a tosyl (CH$_3$C$_6$H$_4$SO$_2$—), a C$_{3-12}$ cycloalkyl, a C$_{2-12}$ alkenyl, a C$_{5-12}$ cycloalkenyl, a C$_{6-12}$ aryl, a C$_{7-13}$ arylalkylene, a C$_{4-12}$ heterocycloalkyl, and a C$_{3-12}$ heteroaryl instead of hydrogen, provided that the substituted atom's normal valence is not exceeded. The number of carbon atoms indicated in a group is exclusive of any substituents. For example —CH$_2$CH$_2$CN is a C$_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A foldable cover assembly (10), comprising
   a glass layer (1) having a first surface (2), a second surface (3) opposite the first surface (2), a first thickness (T$_1$) at a first location (4) and a second thickness (T$_2$) at a second location (5), wherein the second thickness is less than the first thickness, and is effective to provide bendability to the glass layer; and an optically clear polymer film (6) disposed on the first surface of the glass layer, the polymer film comprising a thermoplastic polymer, a thermoset polymer, or a combination comprising at least one of the foregoing, wherein a 100 micrometer-thick sample of the optically clear polymer film transmits greater than 85% of visible light as determined according to ASTM D1003-00;

wherein the second thickness at a center point of the second location is less than the second thickness at a periphery of the second location.

2. The foldable cover assembly of claim 1, wherein the cover assembly transmits greater than 85% of visible light as determined according to ASTM D1003-00.

3. The foldable cover assembly of claim 1, wherein the cover assembly has a surface hardness of at least 7H as measured according to ASTM 3363, a flexibility at the second location of 3R or less as measured according to JIS K6902, or both.

4. The foldable cover assembly of claim 1, wherein the first thickness of the glass layer is 50 micrometers to 1 millimeter.

5. The foldable cover assembly of claim 1, wherein the second thickness of the glass layer is 10 to 750 micrometers.

6. The foldable cover assembly of claim 1, wherein the glass layer comprises chemically strengthened glass, non-strengthened glass, tempered glass, or optically transparent synthetic crystal.

7. The foldable cover assembly of claim 1, wherein the first location is adjacent to the second location.

8. The foldable cover assembly of claim 1, wherein the polymer film comprises poly(ethylene terephthalate, poly(ethylene naphthalate), poly(1,4-cyclohexane-dimethanol-1,4-cyclohexane dicarboxylate), poly(cyclohexanedimethylene terephthalate)-co-poly(ethylene terephthalate), polypropylene, a bisphenol A polycarbonate homopolymer, a bisphenol A polycarbonate copolymer, poly(4,4'-oxydiphenylene-pyromellitimide), poly(methyl methacrylate), polystyrene, polyoxymethylene, poly(ethylene-vinyl acetate, polymethylpentene, or a combination comprising at least one of the foregoing.

9. The foldable cover assembly of claim 1, wherein the polymer film has a thickness of 5 micrometers to 20 millimeters.

10. The foldable cover assembly of claim 1, wherein the cover assembly further comprises an optically clear adhesive layer disposed between the first surface of the glass layer and the polymer film, wherein a 50 micrometer-thick sample of the optically clear adhesive transmits greater than 85% of visible light as determined according to ASTM D1003-00.

11. The foldable cover assembly of claim 1, further comprising an optically clear coating (7) disposed on at least a portion of the second surface (3) of the second location (5) of the glass layer, wherein the coating provides a difference in refractive index of the second location and refractive of the first location that is less than or equal to 0.05, and wherein the optically clear coating has a thickness of 10 to 50 micrometers.

12. A method of manufacturing the foldable cover assembly of claim 1, the method comprising applying the polymer film to the first surface of the glass layer;

contacting a masking layer with the second surface of the glass layer, wherein the masking layer comprises an aperture such that the first location of the glass layer is covered by the masking layer and the second location of the glass layer is exposed;

etching at least a portion of the exposed second location of the glass layer to provide the glass layer having a first thickness at the first location and a second thickness at the second location, wherein the second thickness is less than the first thickness; and removing the masking layer from the cover assembly.

13. The method of claim 12, further comprising applying an optically clear coating (7) on at least a portion of the second surface of the second location of the glass layer, wherein the coating provides a difference in refractive index of the second location and refractive of the first location that is less than or equal to 0.05.

14. An electronic device comprising the foldable cover assembly of claim 1.

15. The electronic device of claim 14, comprising the foldable cover assembly disposed on a display of the electronic device.

16. The electronic device of claim 14, wherein the device is a foldable device.

17. The electronic device of claim 14, wherein the device is a cellular telephone, a smart telephone, a laptop computer, a notebook computer, a tablet computer, a smart watch, an automobile display device, or a medical device.

18. The electronic device of claim 14, wherein the cover assembly is laminated onto the device, or molded onto the device, or adhered onto the device via an adhesive layer, wherein a 50 micrometer-thick sample of the adhesive layer transmits greater than 85% of visible light as determined according to ASTM D1003-00.

19. An accessory for an electronic device comprising the foldable cover assembly of claim 1.

* * * * *